Feb. 10, 1942.   E. P. SEARING   2,272,729
GLASS CLEANING AND POLISHING MACHINE
Filed Jan. 21, 1941    2 Sheets-Sheet 1
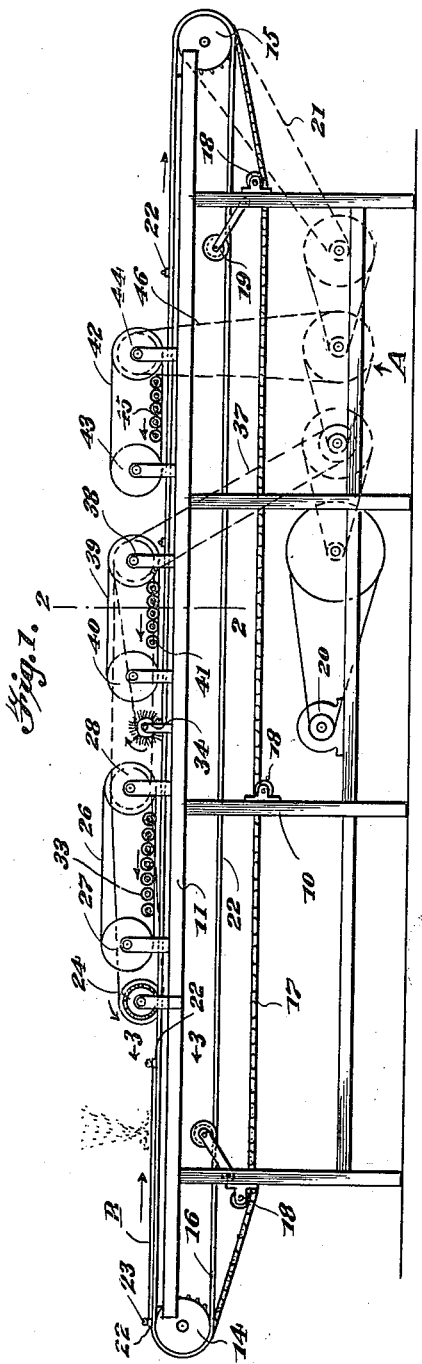
Inventor
EUGENE P. SEARING
By Irving L. McCathran
Attorney

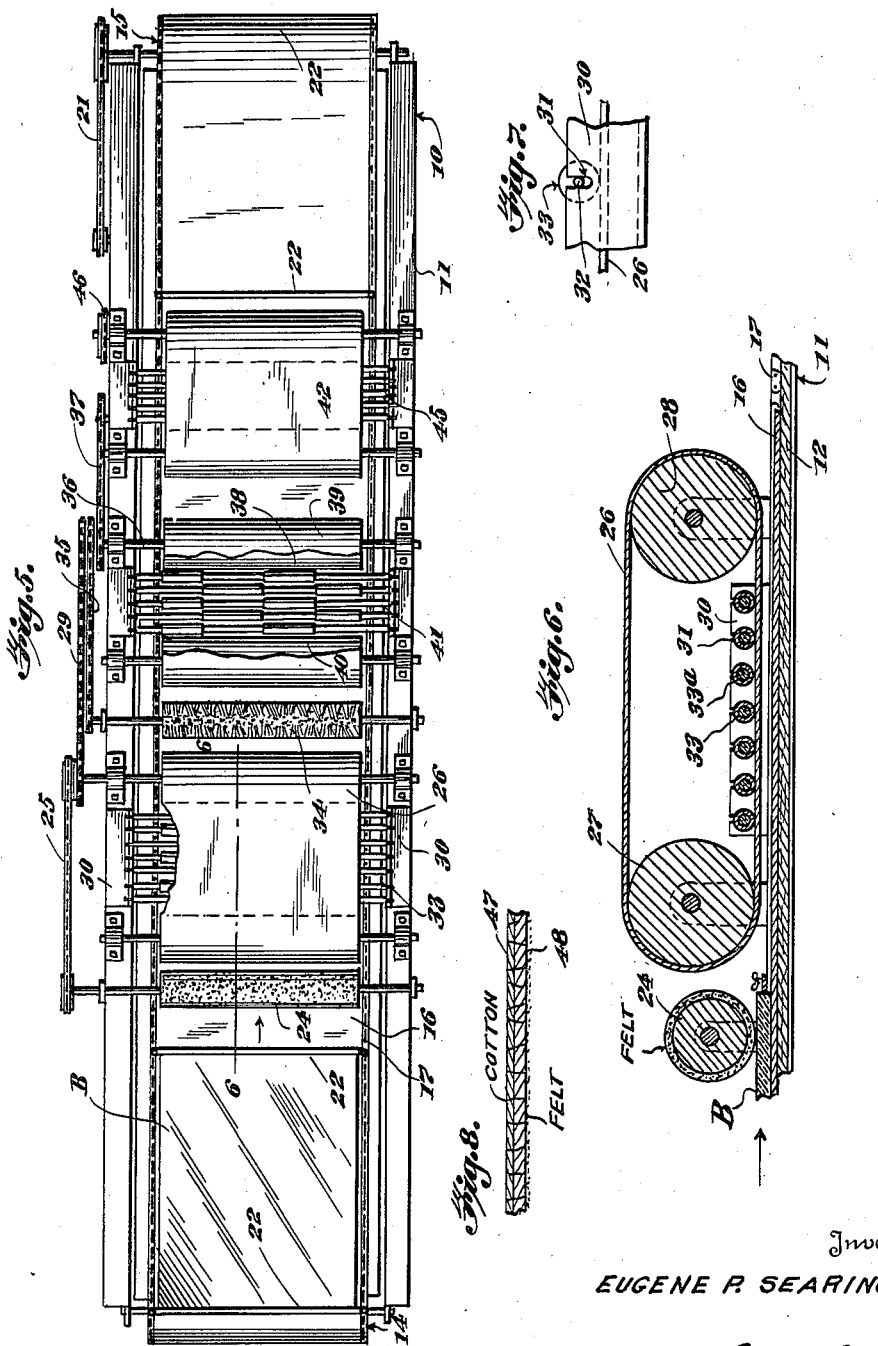

Patented Feb. 10, 1942

2,272,729

UNITED STATES PATENT OFFICE 2,272,729

GLASS CLEANING AND POLISHING MACHINE

Eugene P. Searing, Paterson, N. J.

Application January 21, 1941, Serial No. 375,355

5 Claims. (Cl. 15—4)

This invention relates to glass cleaning and polishing machines, and has for one of its objects in particular. the production of a simple and efficient machine for facilitating the cleaning and polishing of mirror glass.

A further object of this invention is the production of a simple and efficient machine wherein cleaning belts are employed for cleaning the outer surface of plates of glass passing under the cleaning belts and wherein these belts are held in frictional contact with the glass plates by pressure rollers mounted so as to float up and down to yieldably hold the cleaning belts against the plates of glass as the glass passes under the cleaning belts which are mounted to travel in a opposite direction to the direction of travel of the glass.

Other objects and advantages of the present invention will appear throughout the following specification and claims.

In the drawings:

Figure 1 is a side elevational view of the glass cleaning and polishing machine, certain parts of the assembly being shown in diagram because of reduction in size;

Figure 2 is a sectional view taken on line 2—2 of Figure 1;

Figure 3 is a sectional view taken on line 3—3 of Figure 1;

Figure 4 is a top plan view of a series of pressure rollers used in the assembly, a portion of one roller being shown in longitudinal section;

Figure 5 is a top plan view of the machine, a portion of one of the cleaning belts being broken away;

Figure 6 is an enlarged sectional view taken on line 6—6 of Figure 5;

Figure 7 is a fragmentary side elevational view showing a portion of one of the pressure roller guides; and Figure 8 is an enlarged longitudinal sectional view of one of the cleaning belts.

By referring to the drawings, it will be seen that 10 designates the supporting frame of the machine, which is provided with a table 11 carrying a plurality of longitudinal strips 12 constituting the table top. The strips 12 are preferably maple strips and are preferably supported by the transverse supporting slats 13.

Rollers 14 and 15 are mounted at opposite ends of the table 11 and an endless conveyor belt passes over these rollers 14 and 15 and longitudinally of the table 11. The belt 16 is adapted to travel in the direction of the arrows shown in Figure 1, or from the roller 14 toward the roller 15 along the upper face of the table 11. The belt 16 is driven by endless sprocket chains 17, upon opposite sides of the belt 16 and these chains 17 pass over suitable conventional sprockets carried at the ends of the rollers 14 and 15. The chains 17 also pass over suitable idler sprockets 18 suitably located upon the frame 10, and conventional tension rollers 19 are mounted on the frame 10 for engaging the belt 16 to keep the belt taut. A motor 20 is carried by the frame 10 and the roller 15 is driven from a chain 21 which in turn is driven by means of the bank of intermediate sprocket and chain assembly A connected to the motor 20. Conveyor bars 22 extend transversely across the belt 16 and are adjustably secured to the chains 17 by set screws 23 to accommodate the various sizes of glass plates to be placed upon the belt 16.

A felt washer roller 24 is supported upon the table 11 above the belt 16 in sufficient spaced relation to frictionally contact the upper face of a sheet or glass passing thereunder. This roller 24 is spaced inwardly of the table 11 with respect to the roller 14, as shown in Figures 1 and 2. The roller 24 rotates in the direction of the arrows shown in Figure 1, or in a counter-clockwise direction opposite to the direction of travel of the belt 16. This roller 24 is driven by a chain 25.

A primary cleaning belt 26 is mounted in the rear of the roller 24 and this belt 26 passes over the supporting rollers 27 and 28, which rollers 27 and 28 support the belt 26 in a position for frictional contact with the upper face of a glass plate carried by the belt 16 and passing under the belt 26. The chain 25 is driven from the supporting shaft of the roller 28, and the roller 28 is in turn driven by the chain 29.

A pair of pressure roller-supporting guides 30 are carried by the frame 10, one upon each side of the belt 26. These guides 30 are provided with a series of vertically extending notches 31 for receiving the end shafts 32 of the pressure rollers 33. A series of these rollers 33 are provided to extend transversely across the inner face of the belt 26 in close proximity to the belt 16 and normally in line with the lower face of the rollers 27 and 28 as shown in detail in Figure 6. The weight of the pressure rollers 33 will normally provide sufficient pressure to hold the length of the belt 26 in frictional contact with the glass plate B as the plate B passes under the belt 26. The rollers 33, however, are so mounted as to float up and down as necessity demands. The rollers 33 are preferably provided with spaced enlarger portions 33ᵃ throughout their length, the enlarged portions of the various rollers 33 being alternately spaced in zig-zag relation relative to the group of rollers, as shown in Figure 4, and in this way presenting pressure in a series of zig-zag lines across the belt 26.

A brush 34 is mounted in the rear of the belt 26 and extends transversely of the belt 16. This brush 34 is driven by means of a chain 35 and this chain 35, as well as the chain 29, is driven by suitable sprockets carried by the shaft 36. The shaft 36 is driven by a chain 37, the chain 37 being driven by the bank of sprocket and chain assembly A. The shaft 36 carries a roller 38 over which passes a second cleaning belt 39, the cleaning belt 39 being placed in the rear of the brush 34, and also passing over the forward roller 40. Suitable pressure rollers 41 similar to the rollers 33 engage the inner face of the belt 39 adjacent the belt 16 in a manner similar to that described with respect to the rollers 33.

A third cleaning belt 42 is carried by the rollers 43 and 44, in th rear of the belt 39, and suitable pressure rollers 45 similar to the rollers 33 engage the inner face of the cleaning belt 42 to frictionally hold the belt 42 in frictional contact with the glass plate passing thereunder. The roller 44 which carries the belt 42 is driven by a suitable chain 46, which chain 46 in turn is driven between the sprocket and chain assembly A.

The belts 26, 39 and 42 are preferably constructed to comprise an inner cotton strip 47 and an outer felt or cleaning strip 48, as shown in enlarged detail in Figure 8. The roller 24 is preferably provided with a felt covering, as indicated in Figure 6.

In operation a glass plate B is placed upon the conveyor belt 16, the conveyor bars 22 having been previously adjusted according to the size of glass plate used. A suitable cleaning powder, such as Bon Ami is sprinkled upon the glass plate B, as indicated in Figure 1. The felt washing roller 24 is dampened with water, and as the glass plate B travels toward the right in Figure 1 under the roller 24 the Bon Ami will be dampened. The glass plate B will then contact under the belt 26 the contacting face of which travels in the opposite direction of travel to the direction of travel of the belt 16 thereby scrubbing the upper face of the glass plate B and rubbing all stains therefrom. The pressure rollers 33 are mounted to float up and down in the manner described, thereby facilitating the efficient contact of the belt 26 should the belt 16 vary slightly in its movement, or should glass plates of different thicknesses be used. The brush 34 is adapted to sweep the powder back under the belt 26 and is adapted to rotate in the direction of the arrows. The belts 39 and 42 are adapted to dry the surface of the glass and to further polish the same.

It should be understood that the felt strip 48 may be stitched or glued to the face of the cotton belt strip 47, but it is preferable to provide a felt-contacting face to contact the face of the glass plate B to facilitate the cleaning as well as the polishing of the face of glass.

After the glass plate has reached the far end of the conveyor belt 16 over the roller 15, the attendant will remove the glass plate and the operation may continue as previously described. The glass plates B may be placed upon the conveyor belt one at a time to fill the space between the bars 22, and the respective glass plates will be cleaned progressively as they pass under the various belts 26, 39 and 42. All of the belts travel at the same speed.

It should be understood that certain detail changes in the construction, and arrangement of parts may be employed without departing from the spirit of the invention, so long as such changes fall within the scope of the appended claims.

Having described the invention, what I claim as new is:

1. A glass cleaning and polishing machine comprising a table, an endless conveyor belt mounted for longitudinal movement over the top of said table and adapted to receive glass plates, a cleaning belt mounted above said conveyor belt and adapted to travel in an opposite direction to the conveyor belt, a plurality of transverse pressure rollers engaging the cleaning belt for holding the cleaning belt in frictional contact with a glass plate carried by the conveyor belt as the plate passes under the cleaning belt, a plurality of pressure roller-supporting brackets carried by said table, said brackets having vertically extending notches formed in the top edge thereof, and the pressure rollers being journaled within said notches to permit the rollers to float up and down as a glass plate passes under and in frictional contact with the cleaning belt.

2. A glass cleaning and polishing assembly comprising a table, and endless belt passing longitudinally of the table, means for driving said endless belt, a plurality of spaced stop bars adjustably supported relative to the belt and adapted to constitute abutments for supporting a glass plate upon the belt and conveying the plate longitudinally of the table, a washing roller placed near the forward end of the table and extending transversely thereof and mounted for frictional contact with a glass plate adapted to be carried by the endless belt for dampening cleaning material spread upon the glass plate, a primary cleaning belt mounted above the table and extending longitudinally thereof, means for driving said primary cleaning belt in an opposite direction to the travel of the conveyor belt, the cleaning belt having wiping contact with the upper face of a glass plate adapted to be supported by the conveyor belt, a plurality of spaced transverse pressure rollers contacting the cleaning belt in a glass cleaning position, a brush carried in the rear of said primary cleaning belt, and a drying belt located in the rear of the brush and mounted for wiping contact with the upper face of a glass plate passing thereunder and conveyed by the conveyor belt.

3. A glass cleaning and polishing assembly comprising a table, an endless belt passing longitudinally of the table, means for driving said endless belt, a plurality of spaced stop bars adjustably supported relative to the belt and adapted to constitute abutments for supporting a glass plate upon the belt and conveying the plate longitudinally of the table, a washing roller placed near the forward end of the table and extending transversely thereof and mounted for frictional contact with a glass plate adapted to be carried by the endless belt for dampening cleaning material spread upon the glass plate, a primary cleaning belt mounted above the table and extending longitudinally thereof, means for driving said primary cleaning belt in an opposite direction to the travel of the conveyor belt, the cleaning belt having wiping contact with the upper face of a glass plate adapted to be supported by the conveyor belt, a plurality of spaced transverse pressure rollers contacting the cleaning belt in a glass cleaning position, a brush carried in the rear of said primary cleaning belt, a drying belt located in the rear of the brush and mounted for wiping contact with the upper face of a glass plate passing thereunder and conveyed by the conveyor belt, an additional cleaning belt spaced in the rear of the first mentioned drying belt, and transversely spaced pressure rollers contacting each of the drying belts for maintaining pressure upon the wiping portion of the belts.

4. A glass cleaning and polishing assembly comprising a table, a conveyor extending longitudinally of the table, driving means for said conveyor, stop elements adjustably supported relative to said conveyor and constituting abutments for supporting a glass plate upon said conveyor and conveying the plate longitudinally of the table, washing means placed near the forward end of the table and mounted for frictional contact with a glass plate carried by the conveyor for dampennig cleaning material spread upon the glass plate, a primary cleaning means movable in an opposite direction to the conveyor and mounted above the table and having wiping contact with a plate of glass carried by the conveyor, pressure means adapted to contact the cleaning means, brushing means located in the rear of said cleaning means, drying means located in the rear of said brushing means and having wiping contact with said glass plate passing thereunder, and additional cleaning means located in the rear of said drying means.

5. A glass cleaning and polishing machine comprising a table, an endless conveyor belt mounted for longitudinal movement over the top of said table and adapted to receive glass plates, a cleaning belt mounted above said conveyor belt and adapted to travel in an opposite direction to the conveyor belt, a plurality of transverse pressure rollers engaging the cleaning belt for holding the cleaning belt in frictional contact with a glass plate carried by the conveyor belt as the plate passes under the cleaning belt, pressure roller-supporting means carried by said table, said last mentioned means having vertically extending guides, and the pressure rollers being journaled within said guides to permit the rollers to float up and down as a glass plate passes under and in frictional contact with the cleaning belt.

EUGENE P. SEARING.